US008406382B2

(12) United States Patent
Gilbert (10) Patent No.: US 8,406,382 B2
(45) Date of Patent: *Mar. 26, 2013

(54) TRANSPARENT VOICE REGISTRATION AND VERIFICATION METHOD AND SYSTEM

(75) Inventor: Mazin Gilbert, Warren, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/292,436

(22) Filed: Nov. 9, 2011

(65) Prior Publication Data

US 2012/0051525 A1    Mar. 1, 2012

Related U.S. Application Data

(63) Continuation of application No. 12/182,182, filed on Jul. 30, 2008, now Pat. No. 8,077,836.

(51) Int. Cl.
  *H04M 1/64*    (2006.01)
  *H04L 9/00*    (2006.01)
  *G06Q 30/00*   (2006.01)
  *G10L 19/00*   (2006.01)

(52) U.S. Cl. .......... 379/88.01; 340/5.22; 379/88.02; 379/88.03; 382/218; 704/219; 704/236; 704/249; 704/260; 704/275; 705/3; 705/67; 705/75; 713/181; 717/173; 726/7

(58) Field of Classification Search ............ 340/5.22; 379/88.01, 88.02, 88.03; 382/218; 704/219, 704/223, 236, 249, 260, 273, 275; 705/3, 705/67, 75; 713/181; 717/173; 726/7
See application file for complete search history.

(56) References Cited

U.S. PATENT DOCUMENTS

| 5,329,609 | A | 7/1994 | Sanada et al. |
| 5,579,046 | A | 11/1996 | Mitsuhashi et al. |
| 5,694,520 | A | 12/1997 | Lyberg |
| 5,893,057 | A | 4/1999 | Fujimoto et al. |
| 5,940,476 | A | 8/1999 | Morganstein et al. |
| 5,970,143 | A * | 10/1999 | Schneier et al. ............ 713/181 |
| 6,161,090 | A | 12/2000 | Kanevsky et al. |
| 6,401,066 | B1 | 6/2002 | McIntosh |
| 6,463,127 | B1 | 10/2002 | Maier et al. |
| 6,463,412 | B1 | 10/2002 | Baumgartner et al. |
| 6,510,415 | B1 * | 1/2003 | Talmor et al. ............. 704/273 |
| 6,519,565 | B1 | 2/2003 | Clements et al. |

(Continued)

OTHER PUBLICATIONS

"Voice Vault™ World Leaders in Voice Verification" [online], URL: http://www.voicevault.com/ca.aspx, downloaded from the Internet on May 22, 2008.

(Continued)

*Primary Examiner* — Gerald Gauthier (74) *Attorney, Agent, or Firm* — Greenblum & Bernstein, P.L.C.

(57) ABSTRACT

A method includes registering a voice of a party in order to provide voice verification for communications with an entity. A call is received from a party at a voice response system. The party is prompted for information and verbal communication spoken by the party is captured. A voice model associated with the party is created by processing the captured verbal communication spoken by the party and is stored. The identity of the party is verified and a previously stored voice model of the party, registered during a previous call from the party, is updated. The creation of the voice model is imperceptible to the party.

20 Claims, 5 Drawing Sheets

U.S. PATENT DOCUMENTS

| | | | |
|---|---|---|---|
| 6,529,871 B1 | 3/2003 | Kanevsky et al. | |
| 6,529,881 B2 | 3/2003 | Morganstein et al. | |
| 6,615,172 B1 | 9/2003 | Bennett et al. | |
| 6,633,846 B1 | 10/2003 | Bennett et al. | |
| 6,665,640 B1 | 12/2003 | Bennett et al. | |
| 6,799,163 B2 | 9/2004 | Nolan | |
| 6,973,426 B1 | 12/2005 | Schier et al. | |
| 7,050,977 B1 | 5/2006 | Bennett | |
| 7,054,811 B2 | 5/2006 | Barzilay | |
| 7,254,383 B2 | 8/2007 | Novack et al. | |
| 7,778,832 B2 | 8/2010 | Broman et al. | |
| 7,920,693 B2 | 4/2011 | Sharpe et al. | |
| 7,940,897 B2 | 5/2011 | Khor et al. | |
| 8,077,836 B2 * | 12/2011 | Gilbert | 379/88.03 |
| 8,116,436 B2 * | 2/2012 | Isenberg | 379/88.02 |
| 2003/0046083 A1 | 3/2003 | Devinney et al. | |
| 2003/0074328 A1 * | 4/2003 | Schiff et al. | 705/75 |
| 2004/0178880 A1 * | 9/2004 | Meyer et al. | 340/5.22 |
| 2005/0096906 A1 * | 5/2005 | Barzilay | 704/249 |
| 2005/0125258 A1 * | 6/2005 | Yellin et al. | 705/3 |
| 2005/0182631 A1 * | 8/2005 | Lee et al. | 704/275 |
| 2007/0121815 A1 * | 5/2007 | Clark et al. | 379/88.03 |
| 2008/0059191 A1 * | 3/2008 | Huang et al. | 704/260 |
| 2008/0195387 A1 * | 8/2008 | Zigel et al. | 704/236 |
| 2009/0006264 A1 * | 1/2009 | Schultz | 705/67 |
| 2009/0018826 A1 * | 1/2009 | Berlin | 704/223 |
| 2009/0024416 A1 * | 1/2009 | McLaughlin et al. | 705/3 |
| 2009/0138260 A1 * | 5/2009 | Terao | 704/219 |
| 2009/0249323 A1 * | 10/2009 | Nixon et al. | 717/173 |
| 2010/0027767 A1 * | 2/2010 | Gilbert | 379/88.03 |
| 2010/0104201 A1 * | 4/2010 | Raichman et al. | 382/218 |
| 2010/0172485 A1 | 7/2010 | Bourke et al. | |
| 2011/0047605 A1 * | 2/2011 | Sontag et al. | 726/7 |
| 2012/0051525 A1 * | 3/2012 | Gilbert | 379/88.01 |

OTHER PUBLICATIONS

"Product Brief—VoiceTone: A New High-Touch Automation Solution to Delight Customers and Dramatically Cut Transaction Costs," AT&T Knowledge Ventures, Aug. 10, 2006.

* cited by examiner

TRANSPARENT VOICE REGISTRATION AND VERIFICATION METHOD AND SYSTEM

CROSS REFERENCE TO RELATED APPLICATION

This application is a continuation of pending U.S. patent application Ser. No. 12/182,182, filed Jul. 30, 2008, the contents of which are expressly incorporated by reference herein in its entirety.

BACKGROUND

1. Field of the Disclosure

The present disclosure relates to voice verification in service centers. More particularly, the present disclosure relates to a transparent method and system that registers a voice of a party in order to provide voice verification for communications with a service center.

2. Background Information

Many companies use service centers to provide information and services to callers and customers. Often, a company service center will use voice verification techniques to verify the identity of the caller. Voice verification technology uses human voice characteristics to verify whether a caller is the person that the caller claims to be.

During an enrollment phase, a statistical model of a caller's voice is computed and stored in a database. In the enrollment phase, the caller is requested to train the system by repeating random digits and/or phrases, under the supervision by a representative of the service center. The system then applies statistical learning methods to extract voice patterns of the caller, which will be used in subsequent calls to verify the identity of the caller. Then, during a subsequent call by the caller, the voice characteristics of the caller are compared with the stored voice model. If a match occurs, the system will permit the caller to continue. If no match occurs, the system can either reject the caller or direct the call to an operator. The accuracy of the system is dependent upon the quality of data collected from the caller during the enrollment phase.

For instance, ambient noise at the location of the caller during the enrollment phase may result in interference and a less than optimum voice model of the caller. Additionally, a customer's voice may change over time leading to a voice model that no longer matches the customer. Further, some callers who are cognizant of the enrollment phase may speak using a voice pattern, cadence, or tone not indicative of their ordinary conversational characteristics. All of these factors could lead to a potential future rejection of the caller, necessitating another enrollment phase.

DETAILED DESCRIPTION

In view of the foregoing, the present disclosure, through one or more of its various aspects, embodiments and/or specific features or sub-components, is thus intended to bring out one or more of the advantages as specifically noted below.

According to an aspect of the present invention, a method is provided for registering a voice of a party in order to provide voice verification for communications with a service center. The method includes capturing verbal communication spoken by the party during interaction, initiated by the party, between the party and an agent of the service center. A voice model is created that is associated with the party, in which the voice model is obtained by processing the captured verbal communication spoken by the party. The voice model is stored in order to provide voice verification of the party during a subsequent communication with the service center. The registering is conducted without having notified the party of the registration.

According to another aspect of the present invention, the method includes prompting a requester for information, capturing speech of the requester, processing the captured speech of the requester, comparing the processed speech of the requester with the voice model, and determining whether processed speech of the requester matches the voice model, in which the determination includes determining whether the requester is the party. Additionally, a voice model associated with the requester may be created, in which the voice model of the requester is obtained by processing the captured speech of the requester.

According to another aspect of the present invention, the processed speech of the requester is compared with a second voice model associated with the party. Additionally, according to another aspect of the present invention, the requester is forwarded for further screening when the processed speech of the requester does not match the voice model. The party is serviced when the processed speech of the requester matches the voice model. The voice model associated with the party is updated if it is determined that the requester is the party associated with the voice model, in which the updating includes one of modifying the voice model and replacing the voice model.

According to another aspect of the present invention, capturing the verbal communication includes isolating spoken word of the party from spoken word of the agent. According to another aspect of the present invention, at least one subsequent communication from the party is originated from a location distinct from the origin of the interaction initiated by the party.

According to another aspect of the present invention, creating the voice model includes using one of a Gaussian mixture model, hidden Markov model, machine learning algorithm, maximum entropy model, and support vector machine model. Additionally, voice models from a plurality of callers are collected in order to create a cohort model. The interaction may include, for example, a voice over Internet protocol communication, a wireless network communication, and/or a landline communication.

According to still another aspect of the present invention, a system is provided for providing voice registration of a voice of a party to provide voice verification for communications with a service center. The system includes at least one processor configured to capture verbal communication spoken by the party during interaction between the party and an agent of the service center, create a voice model associated with the party from the captured verbal communication, and store the voice model to provide voice verification of the party during a subsequent communication with the service center, wherein the registration is conducted without having notified the party of the registration. The system also includes at least one processor configured to compare captured and processed speech of a requester with the stored voice model and to determine whether the requester is the party. The processor also updates the voice model of the party after a subsequent communication with the party.

According to still another aspect of the present invention, a computer readable medium storing a computer program is provided that registers a voice of a party in order to provide voice verification for communications with a service center. The computer readable medium includes a capturing code segment that captures verbal communication spoken by the party during interaction, initiated by the party, between the party and an agent of the service center, a creating code segment that creates a voice model associated with the party, the voice model being obtained by processing the captured verbal communication spoken by the party, and a storing code segment that stores the voice model to provide voice verification of the party during a subsequent telephone call. The registering is conducted without having notified the party of the registration.

According to another aspect of the present invention a prompting code segment is provided that prompts a requester for information, a second capturing code segment is provided that captures speech of the requester, a processing code segment is provided that processes the captured speech of the requester, a comparing code segment is provided that compares the processed speech of the requester with the voice model, and a determining code segment is provided that determines whether processed speech of the requester matches the voice model, in which the determination includes determining whether the requester is the party.

According to another aspect of the present invention, an updating code segment is provided that updates the voice model associated with the party if it determined that the requester is the party associated with the voice model. At least one subsequent communication from the party is originated from a location distinct from the origin of the interaction initiated by the party.

Figure 1:
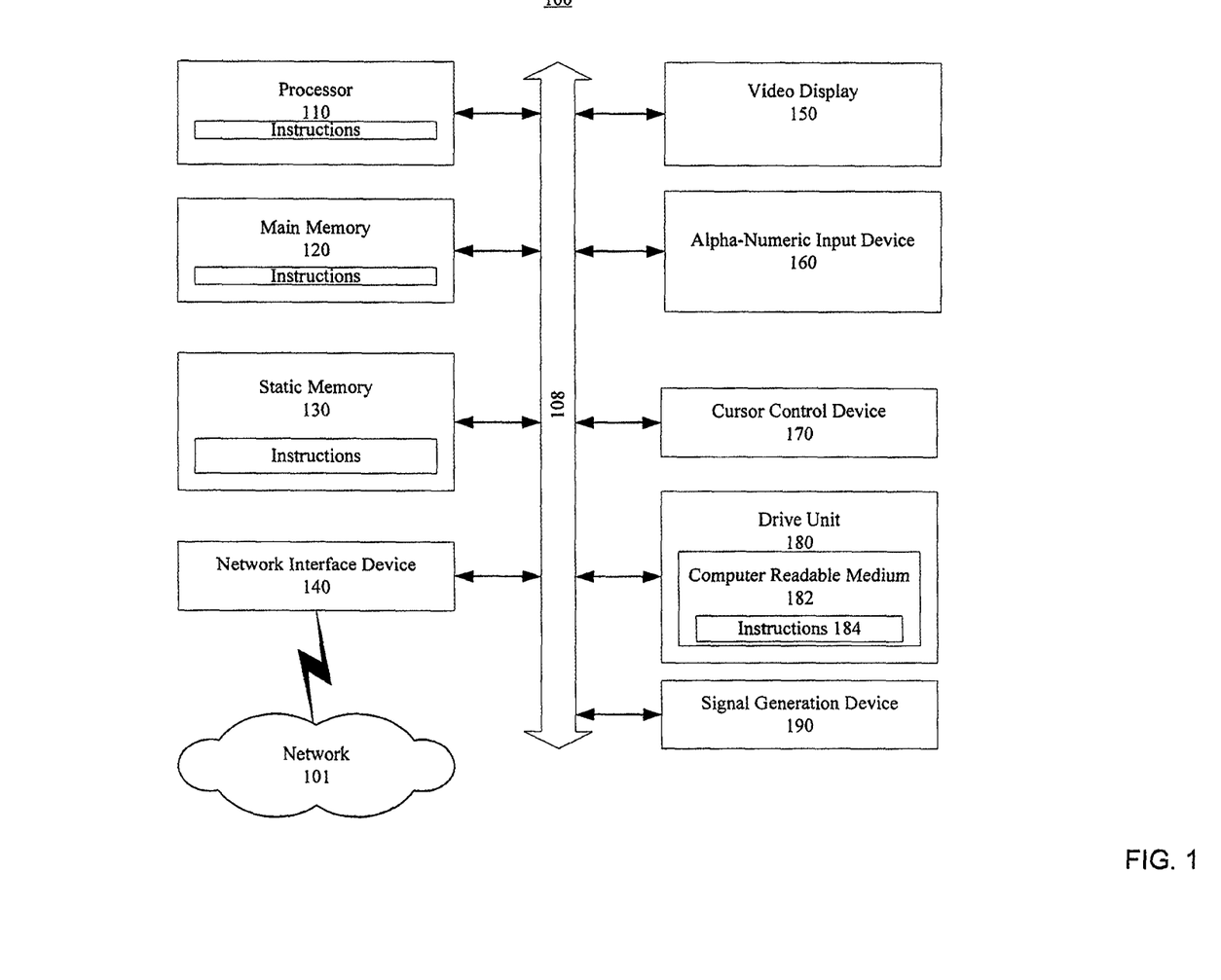
FIG. 1 shows an exemplary general computer system that includes a set of instructions for providing voice verification.

FIG. 1 is an illustrative embodiment of a general computer system, on which a method to provide transparent voice registration and verification can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

Figure 2:
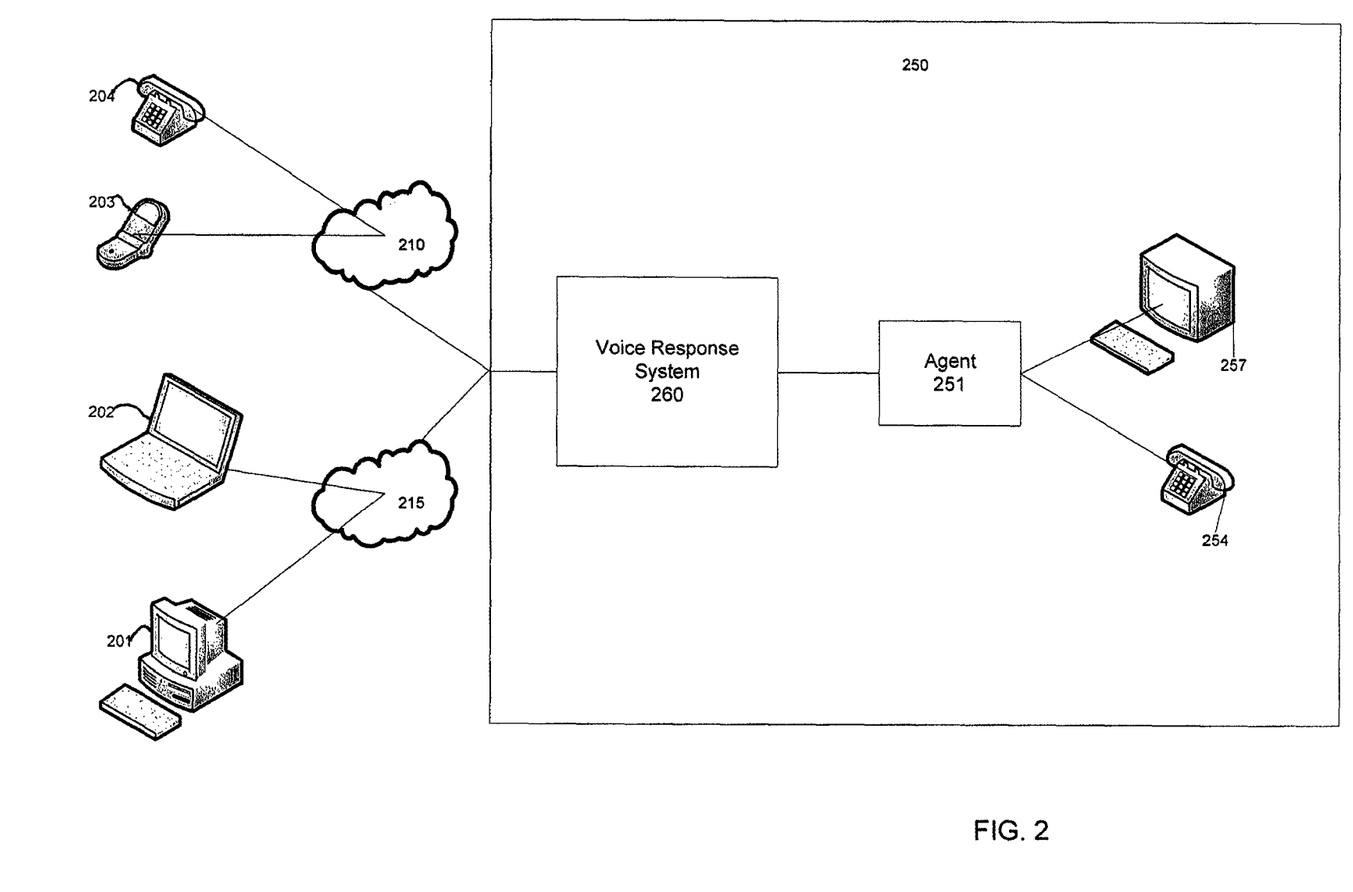
FIG. 2 shows an exemplary telecommunications network architecture, according to an aspect of the present disclosure.

FIG. 2 shows an exemplary service architecture of the telecommunications system of the present invention. As shown, a user device 201 and a user device 202 are connected to a communications network 215. Either or both of the user devices 201, 202 may be a personal computer, a handheld computer, a desktop computer, a laptop computer, a notebook computer, a mini computer, a workstation, a mainframe computer, a mobile web browser, or a personal digital assistant. The user devices noted herein are used as non-limiting examples; however, with reference to the exemplary embodiment of FIG. 2, the user devices 201, 202 refer to any device with a processor or microprocessor that permits access to a communications network.

The communications network 215 may include, e.g., the public switched telephone network (PSTN), the internet, a satellite communications network, a broadband cable network, a local area network (LAN), a wide area network (WAN), and/or a wireless local area network (WiLAN), including any combination thereof. The networks noted herein are used as non-limiting examples; however, with reference to the exemplary embodiment of FIG. 2, the terms "network" and "networks" refer to any combination of networks that provide a medium for transmitting communications between a processor-based user device and a service center and/or voice response system.

Additionally, a user device 203 and a user device 204 are connected to a communications network 210. By way of example, either or both of the user devices 203, 204 may be a conventional landline telephone, a wireless handset, a portable telephone connected to a base station, an internet-enabled smart telephone, and/or any other device that enables audio communication over dedicated network links. The communications network 210 may include the public switched telephone network (PSTN), an advanced intelligent network (AIN), a personal communications service (PCS) network, a code division multiple access (CDMA) network, a time division multiple access (TDMA) network, a global system mobile (GSM) network, a virtual private network (VPN) that provides secure and encrypted communications between nodes of a broader network, a wireless telephone network and/or any network or combination of networks that provide a medium for transmitting audio communications between a customer device and a service center and/or voice response system.

The service center 250 may include an automatic call distributor (ACD) server (not shown) that routes, e.g., telephone calls to agent 251 of the service center 250. Additionally, the service center 250 may include a router (not shown) that routes packetized data to the agent 251 of the service center 250.

In the embodiment of FIG. 2, the link from the communications network 210 to the service center 250 is, e.g., a landline PSTN link that carries audio communications. Additionally, the link from the communications network 215 to the service center 250 is, e.g., a broadband cable connection. In an alternative embodiment, the links from the communications networks 210 and 215 connects directly to voice response system 260.

The service center includes a voice response system 260 functioning as an agent of the service center. An exemplary voice response system is an interactive voice response system (IVR). An IVR is an automated agent application that collects data from a customer using, e.g., speech recognition, natural language processing, and/or dual tone multi-frequency (DTMF) signals. The interactive voice response unit 260 is programmed to follow a script to collect information from a telephone customer. The script may vary according to the information provided by the customer. Additionally, the interactive voice response unit 260 may be programmed to retrieve and provide information to a customer based upon the information provided by the customer. The retrieved information may relate to products or services in regard to which customers may inquire.

The agent 251 may be a human agent provided with, e.g., a corresponding telephone 254 connected to an ACD server. Each human agent may also be provided with, e.g., a corresponding workstation 257 connected to a router. As an example, the workstations may include an internet browser program that enables communications using an internet network.

Additionally, the agent 251 may be an automated agent program executed by a processor and programmed to collect information from a web customer and/or prompt the customer to provide information to a web user. Alternatively, the agent may be another voice response unit such as an interactive voice response unit.

Although not shown, the voice response unit 260 and the workstation 257 may be connected to internal resources such as a database. The internal resources may contain information related to the products and/or services of the service center 250. Using the internal resources, an agent may appropriately respond to customer requests.

Figure 3:
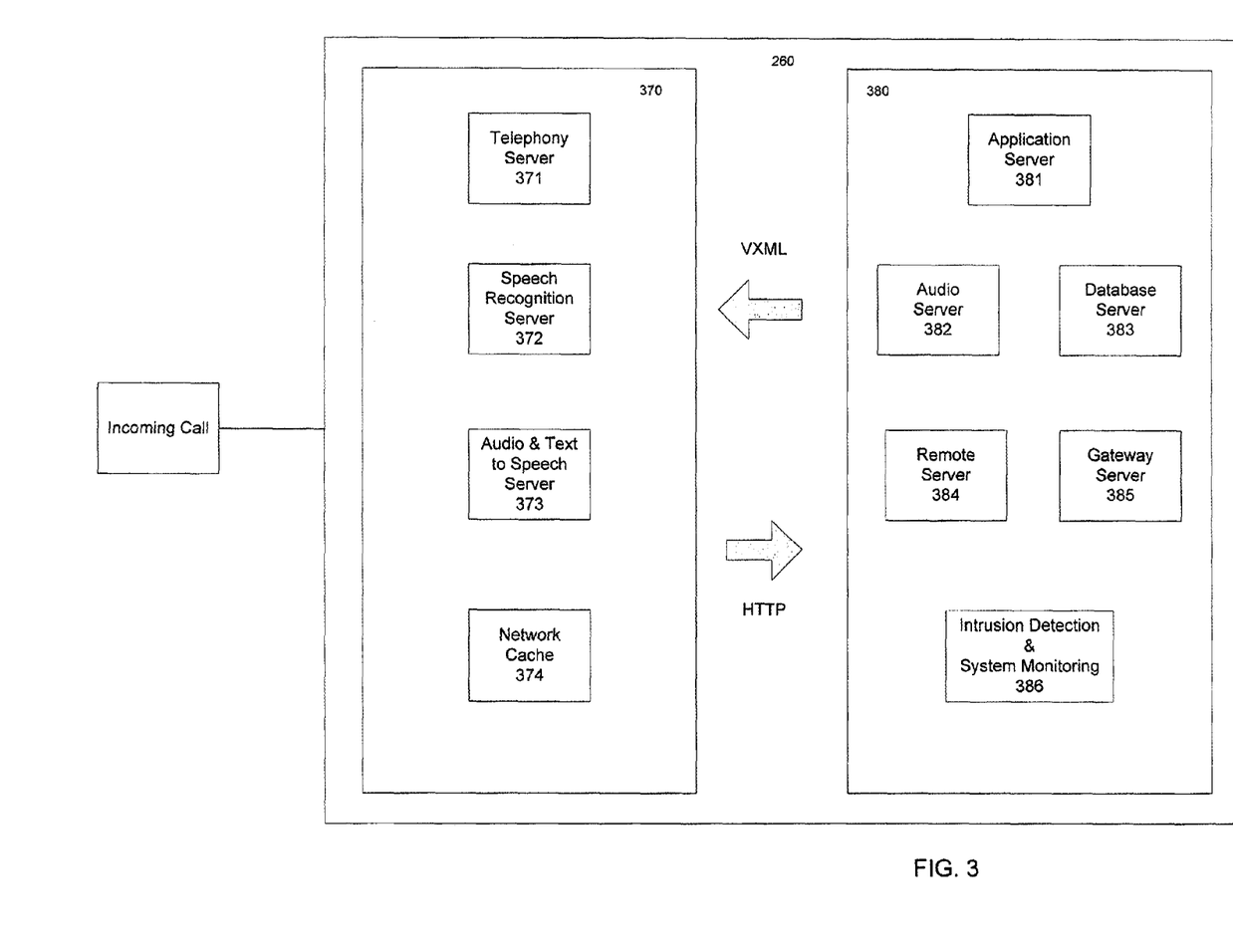
FIG. 3 shows a block diagram of an exemplary voice response system, according to an aspect of the present disclosure.

FIG. 3 shows a block diagram of an exemplary voice verification system, according to an aspect of the present disclosure. An incoming call received at the service center 250 is directed to the voice response system 260, using a suitable communications link. Alternatively, the call may be received directly at the voice response system 260. In one embodiment, the voice response system 260 is a voice-enabled and web-enabled contact service center configured to deliver a personalized and natural customer experience. For example, an exemplary voice response system may be included within the AT&T VoiceTone Services Platform. The exemplary voice response system 260 at the service center 250 includes a media server 370 and a content platform 380. The media server 370 is connected to the content platform 380 and communication there between is facilitated via voiceXML (VXML) and hypertext transfer protocol (HTTP), for example, Voice XML 2.0 and HTTP 1.1. Additionally, the voice response system 260 also supports simple network management protocol (SNMP) and primary rate interface (PRI). The media server 370 includes a telephony server 371, a speech recognition server 372, an audio and text to speech server 373, and a network cache 374. The telephony sever 371 includes, for example, a telephony client subsystem, a voiceXML interpreter, and a speech subsystem. The speech recognition server 372 runs, for example, Watson speech recognition software from AT&T. An exemplary audio and text to speech server 373 includes Natural Voices from AT&T. The content platform 380 includes an application server 381, an audio server 382, a database server 383, a remote server 384, a gateway server 385, and an intrusion detection and monitoring system 386. In an alternative embodiment, the voice response system 260 may include only a speech recognition server and a storage for storing voice models.

When a party (party A) contacts (e.g., calls) the service center 250 for the first time, the party is connected with the voice response system 260. It is noted that the present invention is not limited to calls per se, and that any forms of communication are contemplated. For the purpose of illustration, however, a call will be described. An application, or applications, running on the telephony server 371 of the voice response system 260 prompts the party for information such as name, account number, or other personal information. While an automated message may be played to the party indicating that the call may be recorded, as is typical with voice response systems, the party is not notified that their verbal responses will be used to register their voice with the system and create a voice model. Thus, the calling party's normal, natural voice is captured, providing for a transparent voice registration enrollment process. Further, given the automated nature of the system, no supervisory attendant is required in order to capture the verbal responses spoken by the party and to create the voice model. The voice model is a statistical model of the calling party's voice, also known as a voiceprint or voice DNA, which is based on acoustic and linguistic properties.

As the party responds to the prompts, the speech recognition server 372 captures the verbal responses spoken by the party. If the speech recognition server 372 receives the communication between the party and the agent in stereo, then the speech recognition server 372 isolates the channel carrying the speech of the party. If the speech recognition server 372 receives the communication between the calling party and the agent over one channel, then the speech recognition server 372 employs a segmentation algorithm to isolate the speech of the party from the speech of the agent. Thus, only the speech of the party is captured for processing. Exemplary speaker segmentation algorithms include hidden Markov modeling and hypothesis testing.

In one exemplary embodiment, the speech recognition server 372 captures random digits or phrases spoken by the party. In another exemplary embodiment, the speech recognition server 372 captures only certain parts of speech spoken by the party. In any event, the speech recognition server 372 applies an appropriate algorithm to the captured speech of the party to create a voice model associated with the party. Exemplary algorithms employed by the speech recognition server 372 to create the voice model are the any of the Gaussian mixture models, the hidden Markov models, maximum entropy models, support vector machine models, machine learning algorithms, and any other current or future suitable techniques.

It is noted that the speech recognition and verification, may employ either a text independent method or a text dependent method. In one embodiment, a text independent method is used with the present system; although, a text dependent method may be used in an alternative embodiment. The text dependent method requires a speaker to utter keywords or phrases that have identical text for both the recognition and verification processes. On the other hand, the text independent method does not rely upon specific text being spoken. Thus, with the text independent method, a voice model associated with the party is created based upon what is spoken by the party, without performing an intermediate step of speech recognition on predetermined words or phrases.

Once the voice model is created, the voice model is saved with an appropriate identifier to permit access at a later time. The saved voice model is then sent for storage for later retrieval, e.g. at network cache 374, audio server 382, database server 383, remote server 384, gateway server 385, or other suitable storage device. The stored voice model is retrieved, for example, when a voice verification is required, or when a voice model is updated.

For example, when a subsequent contact (e.g., call) is received at the service center by a requester of information or services claiming to be party A, it is necessary to ensure that the identity of the requester is in fact party A. Accordingly, the subsequent call is routed to the voice response system 260. At the voice response system 260, the speech recognition server 372 captures the speech of the caller in the manner discussed previously. Similarly, a voice model of the requester (e.g., second caller) is made using one of the aforementioned algorithms and the is sent to the comparator. At or about the same time, the voice model of party A is retrieved from the storage for comparison. During the comparison process, a processor compares the voice model of party A with the voice model of the requester to determine whether the identity of the requester is party A. The comparison take place at, for example, the speech recognition server 372 or the application server 381. If the requester (e.g., second caller) is determined to by party A, then the requester is served in accordance with their needs. If the requester is determined not to be party A, then the call is either rejected or routed to an attendant for further security screening. Lastly, if the requester is determined to be party A, then the voice model of party A is updated, as will be discussed later.

Figure 4:
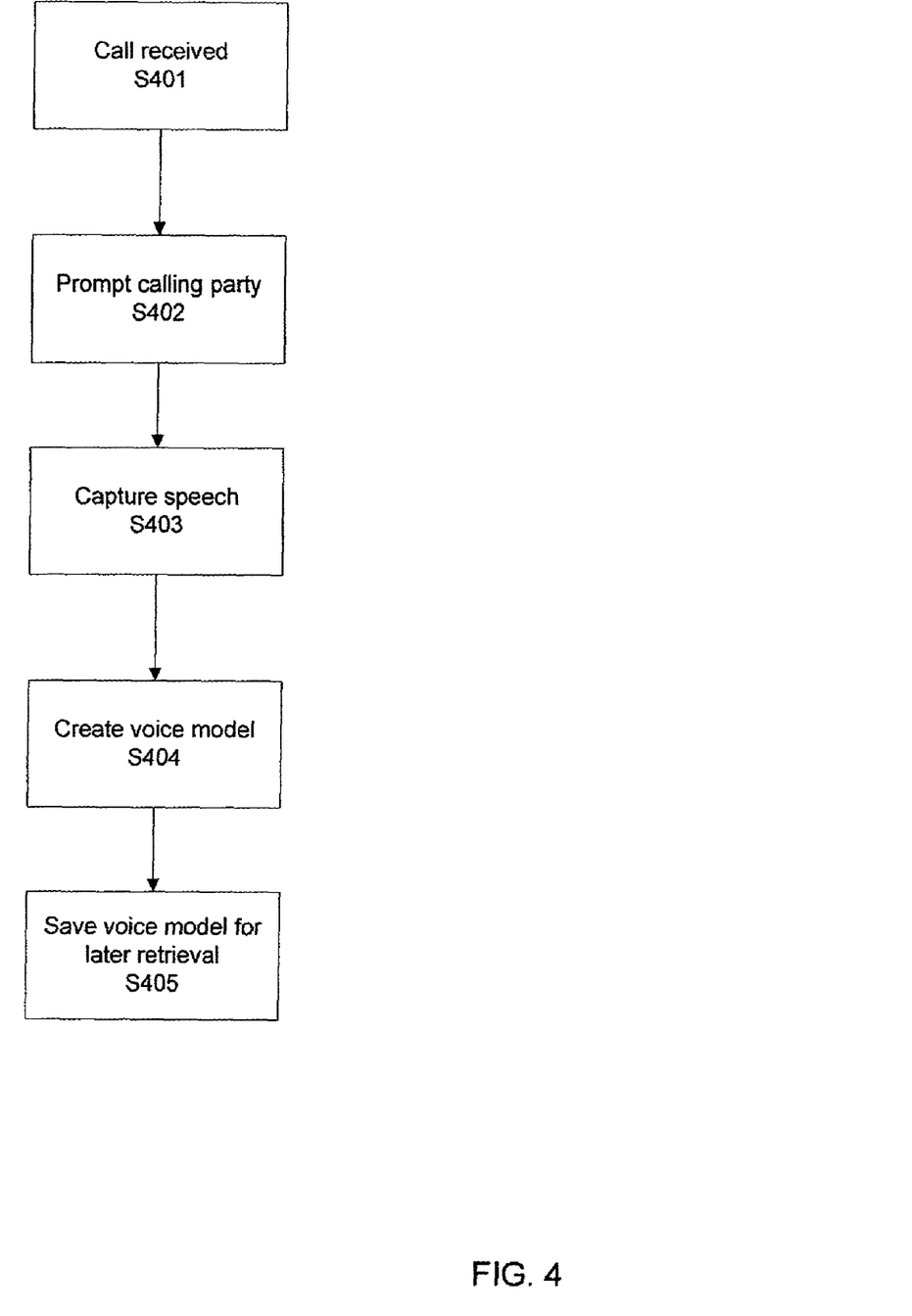
FIG. 4 shows an exemplary flow diagram showing a method for creating a voice model, according to an aspect of the present disclosure.

FIG. 4 shows an exemplary flow diagram showing a method for creating a voice model, according to an aspect of the present disclosure. At step S401, a call from a party is received at the voice response system 260 of the service center 250. For example, the party may be calling to request information regarding their account, a service, a product, etc. In an exemplary embodiment, the voice response system 260 (e.g., agent) of the service center 250 interacts with the party. At step S402, the voice response system 260 prompts the party for information such as name, account number, etc. Again, the party is not notified that their verbal responses will be registered with the system to provide voice verification associated with future calls to the service center. While an automated message may be played to the indicating that the call may be recorded, as is typical with voice response systems, for example, in order to ensure quality control, the party is not notified that their verbal responses will be used to register with the system and create a voice model. Thus, the party's normal, natural voice is captured as a result of the transparent voice registration enrollment process. At step S403, the speech recognition server 372 captures speech of the party in response to the prompts. As discussed above, if the speech recognition server 372 receives the communication between the party and the agent in stereo, then the speech recognition server 372 isolates the channel carrying the speech of the party. If the speech recognition server 372 receives the communication between the party and the agent over one channel, then the speech recognition server 372 employs a segmentation algorithm is employed to isolate the speech of the party from the speech of the agent. Thus, only the speech of the party is captured for processing.

At step S404, the speech recognition server 372 applies an appropriate algorithm to the captured speech of the party to create a voice model. Exemplary algorithms employed by the speech recognition server 372 to create the voice model are the any of the Gaussian mixture models, the hidden Markov models, maximum entropy models, support vector machine models, machine learning algorithms, and any other current or future suitable techniques. At step S405, the voice model is saved with an appropriate identifier to permit access at a later time.

Figure 5:
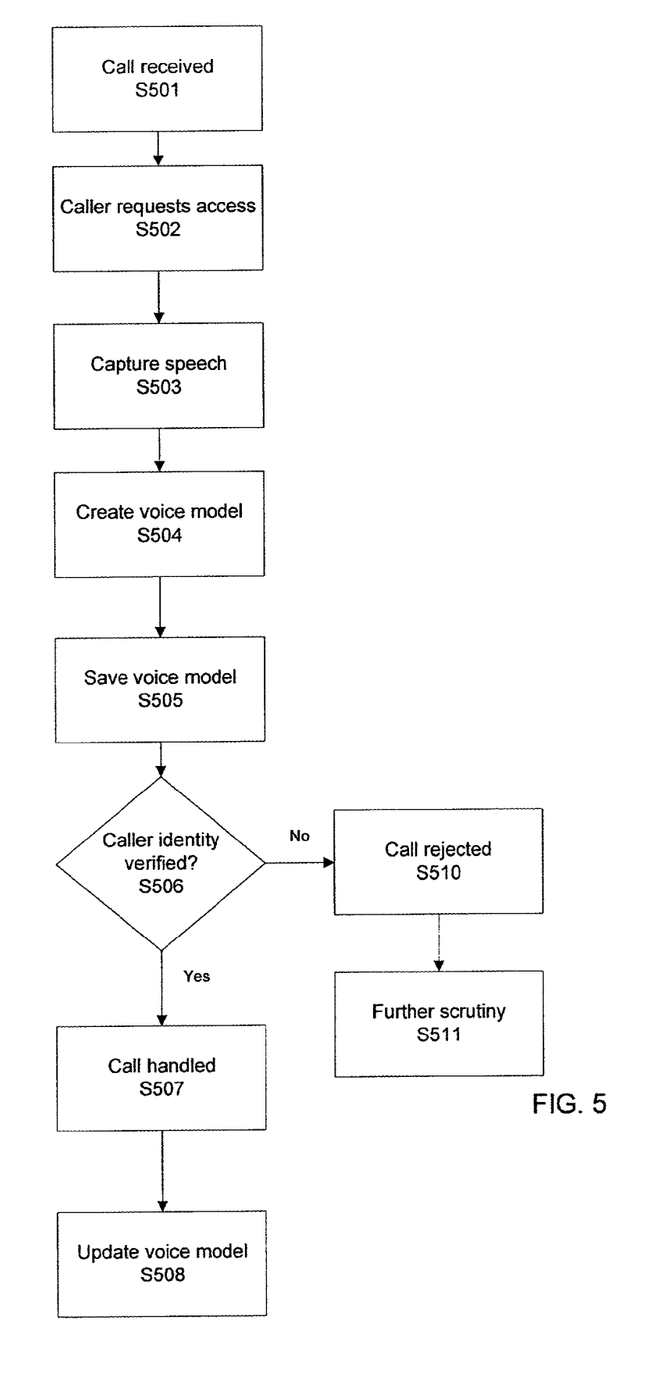
FIG. 5 shows an exemplary flow diagram for comparing spoken word of a caller to a voice model and determining whether a match exists, according to an aspect of the present disclosure.

FIG. 5 shows an exemplary flow diagram for comparing a requester's spoken word to a voice model and determining whether a match exists, according to an aspect of the present disclosure. At step S501, a call from a requester is received at the voice response system 260 of the service center 250. For example, the requester may be calling to request information regarding their account, or other information where it is desirable to confirm the identity of the requester. In an exemplary embodiment, the voice response system 260 of the service center 250 interacts with the requester. At step S502, the requester requests access to, for example, account information. The voice response system 260 prompts the calling party for information such as name, account number, etc. At step S503, the speech recognition server 372 captures speech of the calling party in response to the prompts. As discussed above, if the speech recognition server 372 receives the communication between the requester and the agent in stereo, then the speech recognition server 372 isolates the channel carrying the speech of the requester. If the speech recognition server 372 receives the communication between the requester and the agent over one channel, then the speech recognition server 372 employs a segmentation algorithm is employed to isolate the speech of the requester from the speech of the agent. Thus, only the speech of the requester is captured for processing.

At step S504, the speech recognition server 372 applies an appropriate algorithm to the captured speech of the requester to create a voice model. Exemplary algorithms employed by the speech recognition server to create the voice model are the any of the Gaussian mixture models, the hidden Markov models, maximum entropy models, support vector machine models, machine learning algorithms, and any other current or future suitable techniques. Alternatively, the captured speech of the requester may be processed in any manner in order to permit comparison with the voice model of party A, without the creation of a voice model. At step S505, the voice model of the requester is saved, for example at the network cache 374, the database server 383, or other suitable storage.

At step S506, a determination is made as to whether the requester is the person who they are representing to be, e.g. party A. That is, a comparison is made between the voice model of the requester and the voice model of party A. The comparison is performed using, for example, one of the aforementioned modeling techniques, and is performed at the speech recognition server 372, the application server 381, or other suitable location. If the voice model of the requester matches the voice model of party A (step S506=YES), then the processing of the call continues and the caller is serviced at step S507. If the voice model of the requester does not match the voice model of party A (step S506=NO), then the call is rejected at step S510. In this case, the call is routed to an automated or live agent 251 for further security screening at step S511. As discussed, the speech of the requester is captured and a voice model is created before it is compared to a stored voice model. As alluded to, in another embodiment, the captured speech of the requester is compared to a stored voice model without first creating a voice model associated with the requester. In this embodiment, the captured speech of the requester is processed in any known manner in order to facilitate comparison with the voice model of party A.

Additionally, at step S508, the voice model associated with the party is updated to include any new voiceprint information from the present call. In this regard, the voice model may be either updated or entirely replaced. Thus, with every subsequent call from a particular party, the party's voice model is automatically updated. Alternatively, a check may be performed of the voice model associated with the party, such that the voice model would only be updated if there is a distinction between the new voiceprint information and the voice model. In this fashion, the party's voice model stays current should there be any change in the party's voice, or should the party call from multiple location having differing ambient background noise. Thus, the automatic updating of the system ensures an adaptive system that improves over time. Alternatively, the system may store multiple voice models of a party, such that when a requester contacts the service center, the comparison at step S506 is performed with the voice model of the requester and the multiple voice models of a party, in order to determine whether any match exists.

Accordingly, the present invention enables an organization to provide voice verification services associated with callers to a service center 250. The present invention eliminates the need for customers to train the voice response system, since the enrollment phase is transparent to the party. Since the system is transparent, the present invention reliably creates a voice model of a party, without the party intentionally or subconsciously changing their voice during the enrollment phase. Further, the present invention provides that the party's voice model is updated with each subsequent call of the party, such that the stored voice model will include changes to the party's voice over time, and calls from different locations having various ambient background noise. Additionally, according to an alternative embodiment, voice models from a plurality of callers may be collected to create a cohort model, which may be used during the verification process.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the interactive voice response unit agent 260 shown in FIG. 2 may be provided at a location external to the service center 250, and may receives communications routed from, for example, an ACD server. Additionally, the present invention is not limited to voice registration and verification within a service center environment, but may be applicable to a variety fields where transparent voice registration and verification is desirable.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packed switched network transmission (VXML, HTTP, SNMP, PRI) represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
receiving a call from a party at a voice response system;
capturing verbal communication spoken by the party;
creating a voice model associated with the party, the voice model being created by processing the captured verbal communication spoken by the party;
storing the created voice model in a memory;
verifying the identity of the party; and
updating a previously stored voice model of the party, the previously stored voice model of the party having been registered during a previous call received from the party, wherein the creating of the voice model is imperceptible to the party.

2. The method according to claim 1, wherein verifying the identity comprises determining voiceprint distinctions between the previously stored voice model of the party and the created voice model.

3. The method according to claim 1, further comprising prompting the party for information when the party requests access to account information.

4. The method according to claim 3, wherein the information comprises identifying information associated with the party.

5. The method according to claim 1, wherein verifying the identity comprises comparing the created voice model with the previously stored voice model of the party and identifying a match between the created voice model and the previously stored voice model of the party.

6. The method according to claim 1, wherein the previously stored voice model of the party was created during a registration in which the party was not notified that the previously stored voice model was being created for voice registration.

7. The method according to claim 1, wherein the previously stored voice model of the party is updated by replacing the previously stored voice model of the party with the created voice model.

8. The method according to claim 1, further comprising replacing the previously stored voice model of the party when it is determined that a distinction exists between the created voice model and the previously stored voice model of the party.

9. The method according to claim 1, further comprising associating the created voice model of the party with the previously stored voice model of the party so that a future voice verification can be performed using both of the created voice model and the previously stored voice model of the party.

10. The method according to claim 1, wherein the capturing comprises isolating at least one spoken word of the party from at least one spoken word of an agent of the entity.

11. A system comprising:
a receiver that receives a call; and
at one least server that prompts a party, captures verbal communication spoken by the party during interaction between the party and an agent, creates a voice model associated with the party from the captured verbal communication, stores the created voice model, verifies the identity of the party, and updates a previously stored voice model of the party, wherein the creation of the voice model is imperceptible to the party.

12. A non-transitory computer readable storage medium that stores a computer program that is executable by a computer to:
receive a call from a party;
prompt the party for information;
capture verbal communication spoken by the party;
create a voice model associated with the party, the voice model being created by processing the captured verbal communication spoken by the party;
store the created voice model;
verify the identity of the party; and
update a previously stored voice model of the party, the previously stored voice model of the party having been registered during a previous call received from the party, wherein the creation of the voice model is imperceptible to the party.

13. The non-transitory computer readable medium according to claim 12, wherein the computer verifies the identity by determining voiceprint distinctions between the previously stored voice model of the party and the created voice model.

14. The non-transitory computer readable medium according to claim 12, wherein the party is prompted for the information when the party requests access to account information.

15. The non-transitory computer readable medium according to claim 12, wherein the information comprises identifying information associated with the party.

16. The non-transitory computer readable medium according to claim 12, wherein the computer verifies the identify by comparing the created voice model with the previously stored voice model of the party and identifying a match between the created voice model and the previously stored voice model of the party.

17. The non-transitory computer readable medium according to claim 12, wherein the previously stored voice model of the party was created during a registration in which the party was not notified that the previously stored voice model was being created for voice registration.

18. The non-transitory computer readable medium according to claim 12, wherein the computer updates the previously stored voice model of the party by replacing the previously stored voice model of the party with the created voice model.

19. The non-transitory computer readable medium according to claim 12, wherein the computer updates the previously stored voice model of the party by replacing the previously stored voice model of the party when it is determined that a distinction exists between the created voice model and the previously stored voice model of the party.

20. The non-transitory computer readable medium according to claim 12, wherein the computer updates the previously stored voice model of the party by associating the created voice model of the party with the previously stored voice model of the party so that a future voice verification can be performed using both of the created voice model and the previously stored voice model of the party.

* * * * *